United States Patent [19]

Kohler

[11] 4,354,192
[45] Oct. 12, 1982

[54] RADIO RANGING

[75] Inventor: Hans W. Kohler, Washington, D.C.

[73] Assignee: The United States of America as represented by the Secretary of the Army, Washington, D.C.

[21] Appl. No.: 578,938

[22] Filed: Sep. 6, 1966

[51] Int. Cl.³ ............................................. G01S 13/32
[52] U.S. Cl. ................................. 343/14; 343/7 PF; 102/214
[58] Field of Search ............... 102/70.2 PF, 70.2, 214; 343/7 PF, 12 MD, 13, 9, 14, 17.5

Primary Examiner—Malcolm F. Hubler

Attorney, Agent, or Firm—Nathan Edelberg; Robert P. Gibson; Saul Elbaum

[57] ABSTRACT

A continuous wave frequency modulated ranging system for measuring the distance between the system and a reflecting body. The system generates certain functions of the Doppler signal envelope which have readily identifiable characteristics at specified ranges. This information is used with the amplitude of the received CW-FM signal to determine first by amplitude that the missile is at the approximate desired height, and then to determine by the generated functions the point of burst of the projectile.

13 Claims, 9 Drawing Figures

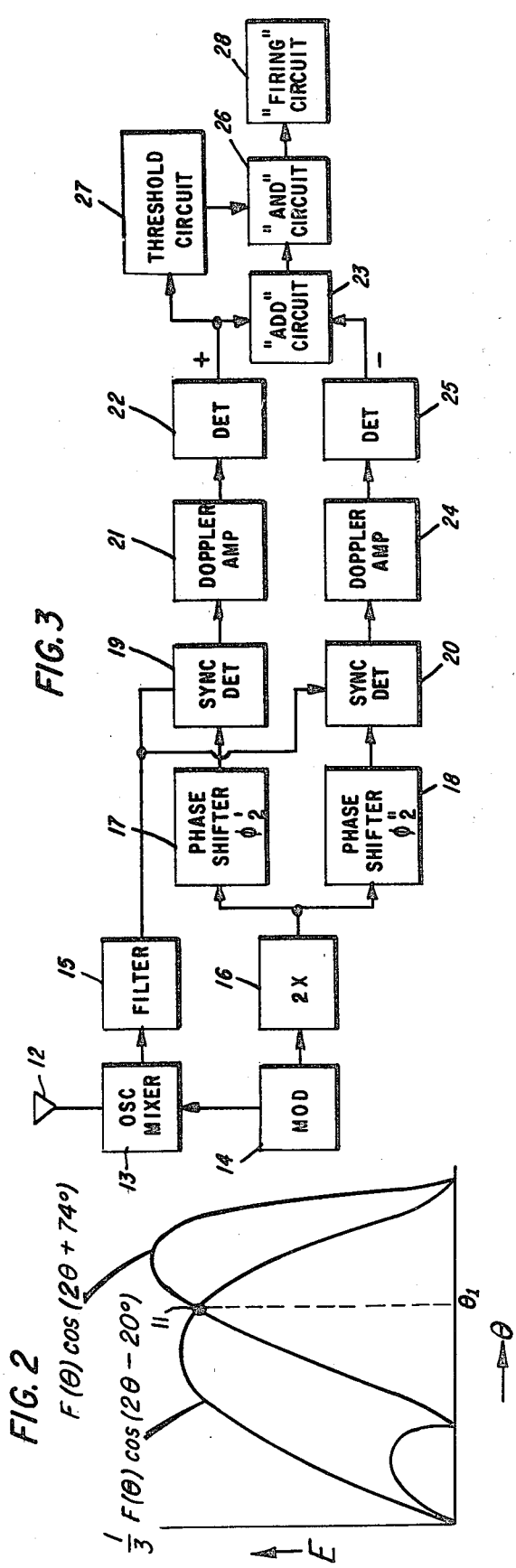
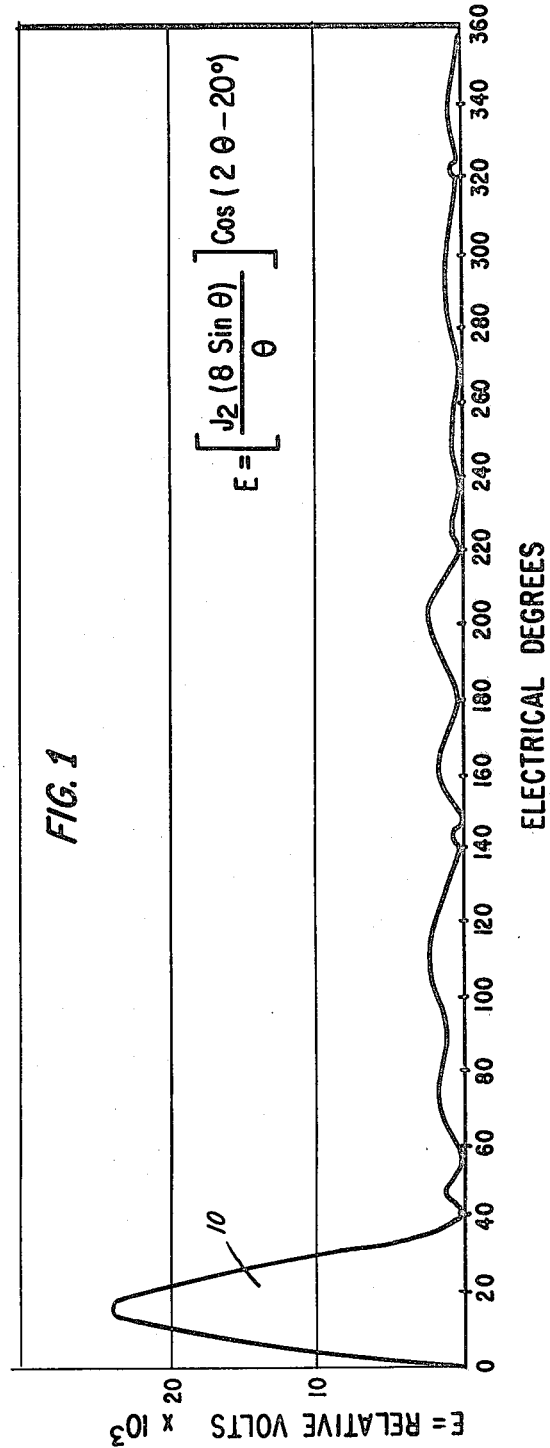

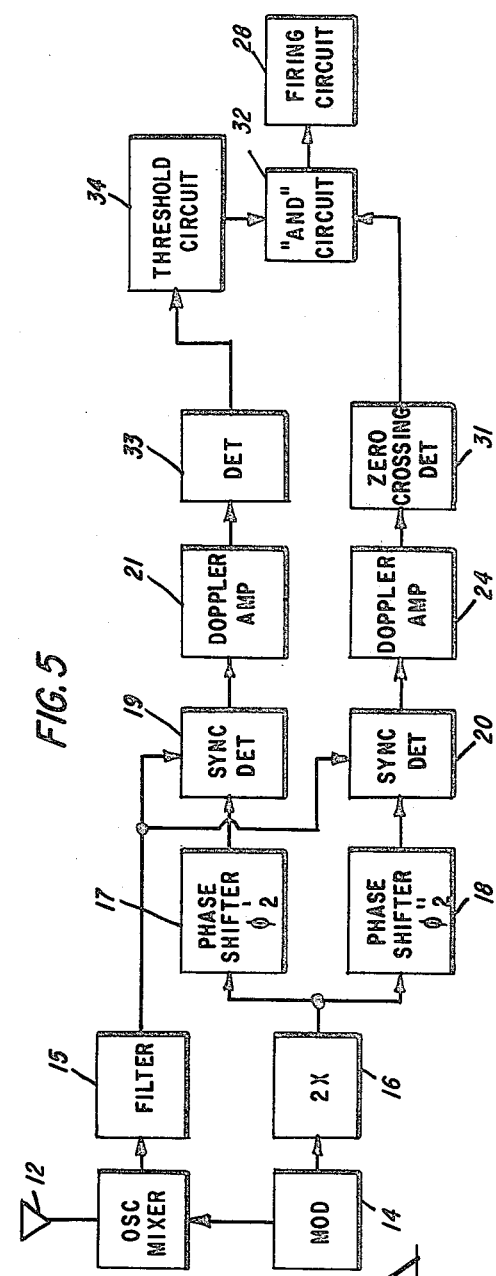
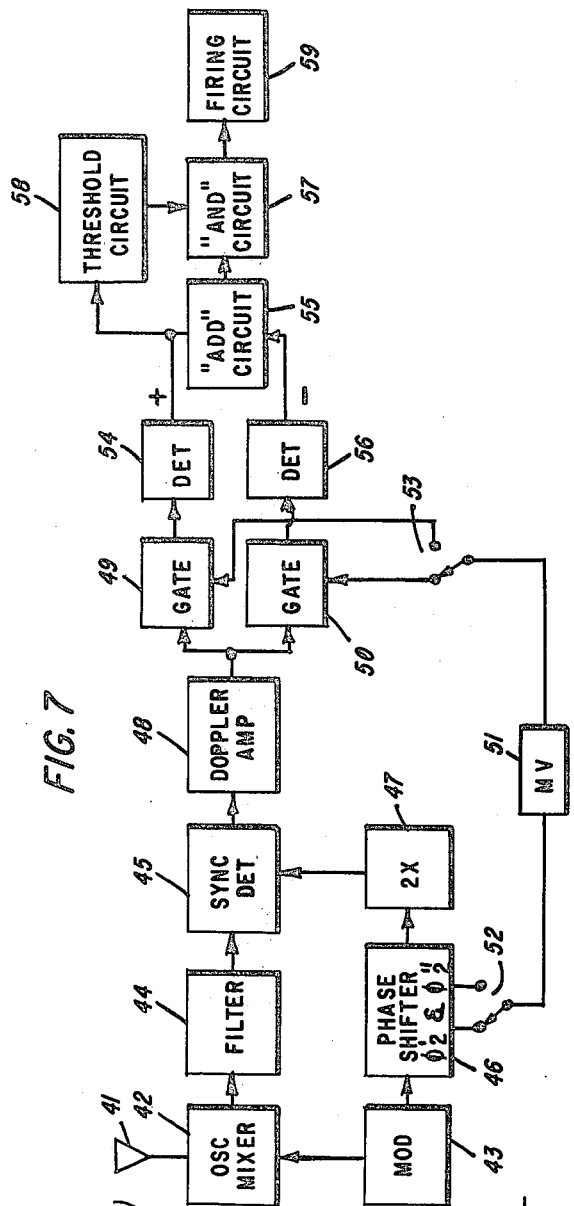

RADIO RANGING

The present invention relates to radio ranging, i.e., to the measurement of distance from a radio transmitter-receiver system to an object reflecting the transmitted radio energy; and more particularly, the invention relates to the use of the reflected Doppler signal envelope in a CW-FM system, to ascertain when the transmitter-receiver system is a given range from the reflecting object. It is contemplated that the primary use of the present invention is as a proximity fuze in an explosive missile, to determine when it is a selected height above ground at which the missile is programmed to fire or burst. Accordingly, the present description of the invention is set forth primarily in this context; however, it should be understood that the invention is not limited to that environment, and other uses will be apparent to those skilled in the art.

With certain types of missiles and explosives, maximum destructive effectiveness is obtained if the burst of the missile is had a determined distance above the target. Assuming the target to be on the ground, the missile is provided with a proximity fuze which triggers the burst at the selected height above ground. In the case of a bomb dropped from an airplane, or in the case of a ground fired missile programmed with a steep trajectory, the accuracy of measurement of the height of the missile by the proximity fuze system is not too critical. With a steep descent, even if the height measurement is off by a significant amount, when the missile or bomb bursts it still will be substantially over the target area. However, if the missile has a relatively flat trajectory, and is programmed to be at a specified height above ground when it is over the target area, it will be readily appreciated that a significant error in the height measurement by the proximity fuze will result in quite a substantial error in location of the missile relative to the target at the time of burst. It is the latter situation with which the present invention is principally concerned, and its purpose is to provide greater accuracy than has been heretofore feasible in CW-FM range measurements utilizing the Doppler signal envelope, particularly as applied to a proximity fuze system designed to control the height of burst of a missile, bomb, or the like.

It is known in the art that the amplitude of a reflected and received CW-FM signal varies as a function of the range of the transmitting vehicle from the object reflecting the signal, and this of course is true of the Doppler signal component of the received signal. This property has been used in proximity fuze systems to measure target range, or height of the missile. However, it suffers from the serious disadvantage that the amplitude of the received signal varies with such parameters as the reflectivity of the target, trajectory and target geometry, antenna field pattern, etc. Accordingly, if the proximity fuze system is set to fire the missile burst when the received signal amplitude reaches a predetermined value, the height of burst will vary significantly depending upon such variables as above suggested.

In accordance with the present invention, the foregoing error resulting from the use of the amplitude of the signal alone, is essentially eliminated by combining therewith one or more measurements whose characteristics do not contain the amplitude errors. In a CW-FM system, one can generate certain functions of the Doppler signal envelope, which will obtain readily identifiable characteristics at specified ranges. For example, one can generate a pair of functions which intersect, or a single function which reverses in phase or goes through a zero crossing, or has a minimum amplitude at a predetermined range from the reflecting target. Of course, these characteristics of the generated functions appear at multiple range positions, and therefore cannot be used alone as the criterion for triggering the missile burst. Instead, the information derived from the foregoing generated functions is used in combination with amplitude information to determine first by amplitude that the missile is at the approximate desired height, and then to determine by the generated functions the exact point of burst.

It is accordingly one object of the present invention to provide for ranging with transmitted and reflected energy by utilizing the strength of the reflected received energy as an approximate determination of range, and by using an identifiable characteristic of a function generated with the reflected energy as an exact determination.

Another object of the present invention is to provide for ranging with transmitted and reflected energy by generating a function utilizing the reflected signal which has an identifiable characteristic that occurs at a plurality of predetermined range positions, and utilizing the strength of the reflected signal to identify a particular one of said range positions.

Another object of the present invention is to provide for the occurrence of a particular effect at a given range of a vehicle from an object by ranging with transmitted and reflected energy, by triggering said effect in response to the combined presence of a given identifiable characteristic in a function generated with the reflected energy, along with a given amplitude characteristic of the reflected energy.

Another object of the present invention is to provide for proximity fuze ranging as above-described.

And another object of the present invention is to provide for such proximity fuze ranging to control the height of burst of a missile, bomb, or the like.

Other objects and advantages of the present invention will become apparent to those skilled in the art from a consideration of the following detailed description of the invention had in conjunction with the accompanying drawings, in which like numerals refer to like or corresponding parts and wherein:

FIG. 1 is a plot of distance, expressed in degrees $\theta$, against amplitude E, of a second order Bessel function of the Doppler signal envelope of a CW-FM system, modified pursuant to a feature of the present invention.

FIGS. 2, 4, 6 and 8 are CW-FM Doppler envelope curves of distance, expressed in degrees $\theta$, versus amplitude E, of small portions of modified second order Bessel functions; and FIGS. 3, 5, 7 and 9 are functional block diagrams of CW-FM ranging systems representing several embodiments of the present invention.

Figure 8:
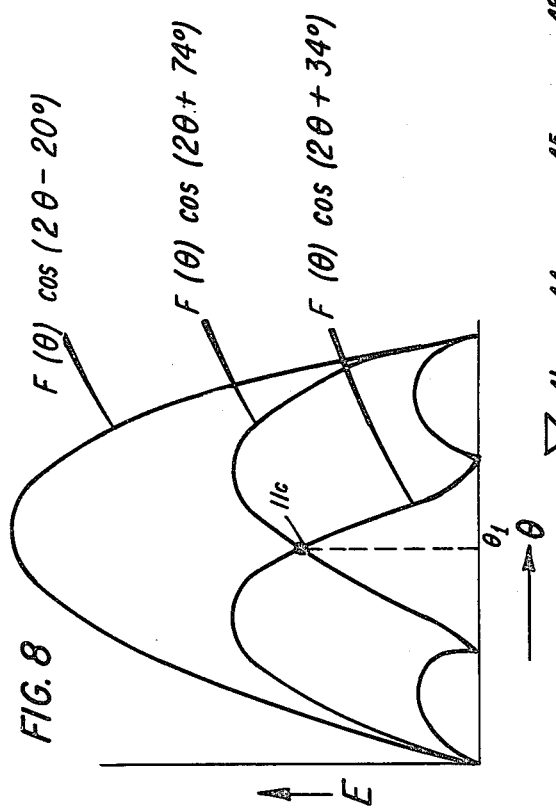

Before providing detailed descriptions of the embodiments of the invention shown in the drawings, it will be useful to set forth the mathematical equations defining the functions utilized. As previously mentioned, the present invention utilizes the Doppler signal envelope in a CW-FM system. The equation defining this envelope can be expressed as $$E = k\, F(\theta)\, \cos(n\theta - \phi_n) \tag{1}$$

where
- E = amplitude of Doppler signal
- k = a constant
- $\theta = 2\pi D/\tau_m$
- D = range between vehicle and object, or height of missile from ground.
- $\tau_m$ = wavelength of modulation frequency = $c/f_m$
- c = speed of light
- n = a positive integer
- $\phi_n$ = a constant phase angle.

For a first kind, second order Bessel function $$F(\Theta) = \frac{J_2(2\Delta F/\mu \sin\Theta)}{\Theta} \quad (2)$$

where
- $J_2$ = Bessel function of first kind and second order.
- $\Delta F/\mu$ = frequency modulation index = $\gamma$.
- $\Delta F$ = frequency deviation of carrier.
- $\mu$ = modulation frequency.

Utilizing the $J_2$ function, n in equation (1) is taken as 2, and the Doppler envelope can then be expressed as $$E = k\, F(\theta) \cos(2\theta - \phi_2) \quad (3)$$

For reasons that will become apparent subsequently, and in order to avoid ambiguities in the operation of the system, it is desirable to obtain the optimum advantage of the range law by maximizing the ratio of the major peak to the largest minor peak in the function expressed in equation (3). This effect is illustrated in the graph of FIG. 1, wherein the function of equation (3) is plotted for a given phase angle $\phi_2 = 20°$ with $2\Delta F/\mu = 8$. It will be seen that the first peak, designated by the numeral 10, is much larger than any of the subsequent lesser peaks and this condition is maximized by the particular value selected for $\phi_2$. It is this major peak 10 that will be utilized in the subsequent embodiments of the invention to establish the approximate range or height by signal amplitude, within which the more precise criterion of a selected range will be rendered effective. As is apparent from FIG. 1, by selecting the major peak 10, it can be identified by utilizing an amplitude portion that is substantially greater than any of the minor peaks.

Referring next to FIG. 2, a portion of two selected $J_2$ Doppler envelope functions are described in terms of amplitude E versus distance or angle $\theta$, for those portions of the functions corresponding approximately to the major peak 10 of FIG. 1. These two functions are selected to provide an intersection point 11 occurring at the range value $\theta_1$. Of course other intersections between these functions occur at other values of $\theta$, but the value $\theta_1$ is identified by the distinguishing large amplitude of peak 10 of the function $F(\theta) \cos(2\theta - \phi_2)$.

The system shown in FIG. 3 is designed to generate the two functions of FIG. 2. The drawing is a functional block diagram including a conventional CW-FM transmitter and receiver comprising antenna 12, connected to an oscillator and mixer 13, in turn fed by the FM modulator 14. By this means a frequency modulated RF signal is continuously transmitted and received. In light of the foregoing description, it is desired to extract from the received signal the second order Bessel function $J_2$ and that is accomplished by the filter 15 which passes only that function from the mixer output. At the same time, the modulation signal from modulator 14 is doubled by frequency doubler 16, and that signal is coupled in two parallel paths through two phase shifters 17 and 18, each of which effects a selected fixed change in the phase angle of the doubled FM modulation signal. The output of phase shifter 17 is mixed with the output of the filter 15 in synchronous detector 19, and similarly the output of phase shifter 18 is mixed with the output of filter 15 in synchronous detector 20. Because the signal from modulator 14 fed to the synchronous detectors is doubled, and because the filter 15 passes only the $J_2$ function of the echo signal, the output of the synchronous detectors is the $J_2$ function of the Doppler signal envelope corresponding to the function of equation (3), and the phase angle $\phi_2$ of equation (3) is established by the phase shift indicated as $\phi_2'$ for shifter 17 and $\phi_2''$ for shifter 18. Assuming $\phi_2'$ is chosen to have a value of $-74°$, the output function of detector 19 is the curve shown in FIG. 2 as $F(\theta) \cos(2\theta + 74°)$. And if $\phi_2''$ is chosen to have a value of $+20°$, the output function of detector 20 is the curve shown in FIG. 2 as $F(\theta) \cos(2\theta - 20°)$. In order to optimize operation and obtain intersection 11 at a desired value of $\theta$, only one third the value of amplitude E is employed for the latter function, as indicated in FIG. 2.

The output of synchronous detector 19 is amplified in Doppler amplifier 21, and then detected for the positive signal therein by detector 22. This positive signal is applied to the "add" circuit 23. Simultaneously, the output of synchronous detector 20 is amplified by Doppler amplifier 24 and is then detected to pass the negative portion of the signal by detector 25. This negative signal is applied to the "add" circuit 23. At a range or missile height corresponding to $\theta_1$ (FIG. 2), the two functions plotted in FIG. 2 intersect. Therefore, at that point the "add" circuit 23 obtains an algebraic sum of zero, and is designed to thereupon provide an output signal to the "and" circuit 26. The output of detector 22 is also applied through a threshold circuit 27 to the "and" circuit 26, so that only when the amplitude of the output of detector 22 exceeds a predetermined value, a signal is applied through the threshold circuit 27 to the "and" circuit 26. This amplitude signal is of course the value E in equation (3), and is selected on the basis of the major peak 10 of the curve of FIG. 1 to distinguish over the minor peaks and to indicate that the range is in fact within the values of $\theta$ spanned by this major peak 10.

When the "and" circuit conditions are satisfied by the combined application of signals from the threshold and "add" circuits, the "and" circuit provides an output signal to trigger the firing circuit 28 of the missile.

A second embodiment of the invention is shown in FIGS. 4 and 5. As shown in FIG. 4, one of the $J_2$ Doppler signal functions selected is $F(\theta) \cos(2\theta + 58°)$, which provides a zero crossing at point 11a, corresponding to the range or angle $\theta_1$. The other function employed is embodied in the curve $F(\theta) \cos(2\theta - 20°)$. These functions are obtained by means of the circuit indicated in FIG. 5. Much of this circuit is the same as in FIG. 3, and corresponding parts have been correspondingly numbered, so that a detailed description of the operation of these parts is unnecessary. In this circuit the value $\phi_2'$ for the phase shifter 17 is selected to be $+20°$, so that the output of detector 19 is embodied in the function $F(\theta) \cos(2\theta - 20°)$. The value of $\phi_2''$ for the phase shifter 18 is selected to be $-58°$, thereby providing an output from detector 20 of $F(\theta) \cos(2\theta + 58°)$.

The output of Doppler amplifier 24 is coupled to the zero crossing detector 31, so that when the zero crossing at 11a is obtained at missile range or height $\theta_1$ (FIG. 4), a signal is obtained from detector 31 which is coupled to the "and" circuit 32. Simultaneously the output of Doppler amplifier 21 is detected at 33, and passed through threshold circuit 34. When the value of this signal exceeds the preset threshold value, a signal is delivered to the "and" circuit 32. Thus, the amplitude value of curve $F(\theta) \cos(2\theta-20°)$ conditions the "and" circuit to triggering level, and the zero crossing of point 11a in curve $F(\theta) \cos(2\theta+58°)$ then triggers the "and" circuit 32 to energize the firing circuit 28 of the missile.

The foregoing embodiments of the invention provide for simultaneous processing of the signals used to determine the firing point of the missile, while the subsequent embodiments provide a time sharing mode of processing these signals.

FIGS. 6 and 7 illustrate a third embodiment of the invention, utilizing the same functions as in the embodiment of FIGS. 2 and 3 to obtain the missile firing point. The functions utilized are illustrated in FIG. 6, and a block diagram of the system is presented in FIG. 7. As in the preceding embodiments, a CW-FM transmitter and receiver is embodied in the antenna 41, the oscillator and mixer 42, and the FM modulator 43. The received signal obtained from the oscillator and mixer 42 is filtered at 44 to obtain the Bessel function of the first kind and second order, referred to as $J_2$, and this function is applied to the synchronous detector 45. The modulator signal from 43 is passed through a phase shifter 46, then doubled in frequency at 47, and mixed with the $J_2$ signal in the synchronous detector 45. The resultant signal is the Doppler envelope of the $J_2$ function, which is amplified in the Doppler amplifier 48, and then applied to two gate circuits 49 and 50.

Multivibrator 51 operates an electronic switching system which is shown functionally as two single pole double through switches 52 and 53. These switches change the phase shifter values between the $\phi_2'$ and $\phi_2''$ values required for the two functions defined in FIG. 6, and at the same time switch the gates 49 and 50 on and off in sequence, so that gate 49 is on and gate 50 is off when the phase shift value is $\phi_2'$ for the function $F(\theta) \cos(2\theta+74°)$, and 49 is off and 50 is on when the phase shift value is $\phi_2''$ for the function $F(\theta) \cos(2\theta-20°)$.

The function $F(\theta) \cos(2\theta+74°)$ when passed by gate 49 is detected at 54 to provide the positive side of the signal, and this is coupled to the "add" circuit 55. The function $F(\theta) \cos(2\theta-20°)$ when passed by gate 50 is detected at 56, and the negative portion of this signal is applied to the "add" circuit 55. When the missile height is at $\theta_1$ of FIG. 6, the two functions cross at 11b, providing a zero "add" output, which is one of the conditions for activation of the "and" circuit 57. The output of detector 54 is also coupled to the threshold circuit 58, which is set to provide an output signal when the amplitude E of the $F(\theta) \cos(2\theta-20°)$ function exceeds a value which is present only in the main peak 10 of the FIG. 1 plot. When the "and" circuit 57 is energized by both a zero signal from "add" circuit 55 and a signal from the threshold circuit 58, the "and" circuit emits a signal to energize the firing circuit 58 of the missile.

FIG. 8 shows the use of three $J_2$ function Doppler envelope signals to ascertain the firing height for a missile. The functions $F(\theta) \cos(2\theta+74°)$ and $F(\theta) \cos(2\theta+34°)$ have a crossing point 11c at the range or missile height of $\theta_1$, which is selected as the firing or burst height. Function $F(\theta) \cos(2\theta-20°)$ is used as the amplitude signal to indicate that the range is within the main lobe or peak 10 of the curve shown in FIG. 1.

Figure 9:
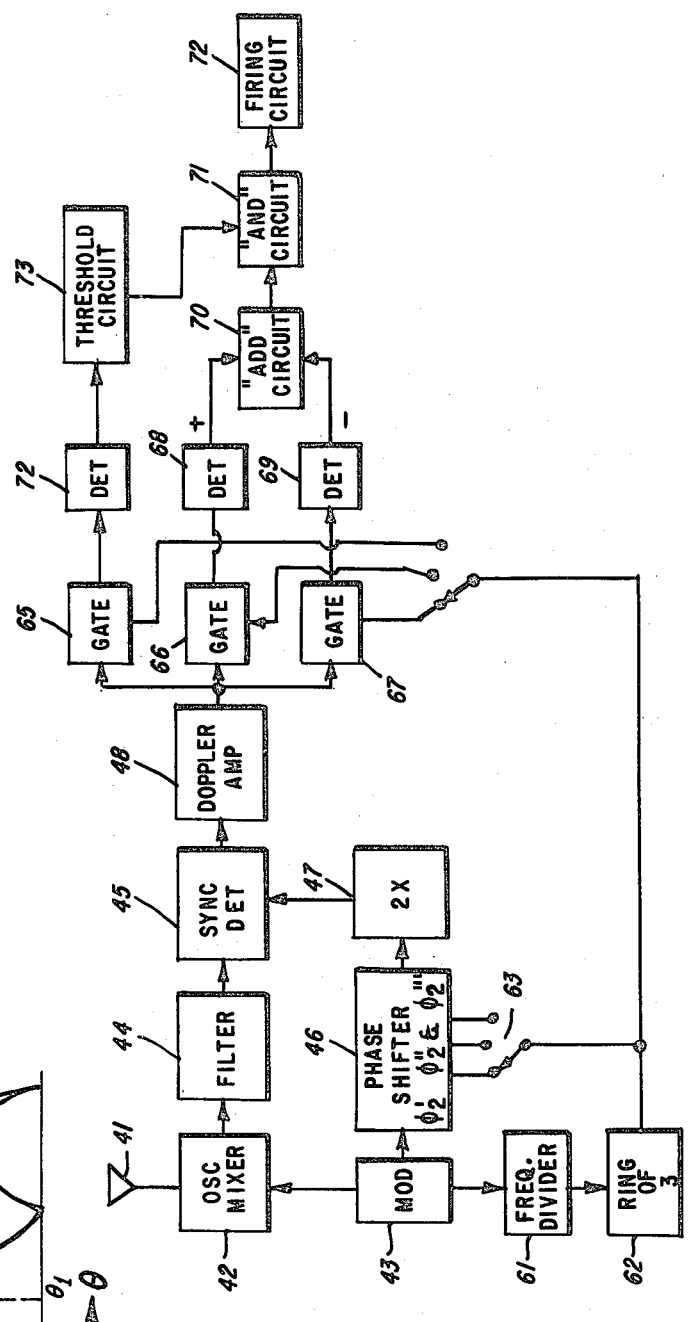

The circuit for detecting the crossing point 11c is presented in FIG. 9. The function and operation of the antenna 41, oscillator-mixer 42, modulator 43, $J_2$ filter 44, synchronous detector 45, phase shifter 46, frequency doubler 47, and Doppler amplifier 48 are the same as in the embodiment of FIG. 7 and need not be repeated in detail. It is sufficient to point out that the phase shifter 46 is designed to produce the three phase shifts required for the three $\phi_2$ values in the three functions indicated in FIG. 8. As each of these phase shifts are selected, the corresponding function is produced at the output of Doppler amplifier 48.

The output of FM modulator 43 is passed through frequency divider 61, and then used to operate the ring of three counter 62. This counter operates an electronic switching circuit, functionally indicated by the two single pole, triple throw switches 63 and 64. Switch 63 controls the three different phase shifts $\phi_2$ obtained from shifter 46, while switch 64 simultaneously energizes the appropriate one of gates 65, 66, and 67. Gate 65 passes the function $F(\theta) \cos(2\theta-20°)$, while gates 66 and 67 pass the other two functions respectively. Thus, the signal passed by gate 66 is detected at 68 for the positive portion of this signal, and the signal passed by gate 67 is detected at 69 for the negative portion of this signal. Both are coupled to the "add" circuit 70, and when they are equal in amplitude, the "add" circuit produces its zero signal output indicating that the range $\theta_1$ is obtained. And this output is applied to the "and" circuit 71.

At the same time, the signal passed by gate 65 is detected at 72, and coupled to the threshold circuit 73. When the amplitude of the function $F(\theta) \cos(2\theta-20°)$ exceeds the value set by the threshold circuit 73 so as to indicate that the range $\theta$ is within the main peak 10 of FIG. 1, a signal from the threshold circuit is coupled to the "and" circuit. When both the threshold circuit and "add" circuit signals are applied to the "and" circuit 71, its output energizes the missile firing or burst circuit 72.

From the foregoing description of several specific embodiments of the invention it will be appreciated that there is provided a system for determining the existence of a given range from a vehicle to an object, such as the height of a missile from ground, by the use of the Doppler signal in a CW-FM system. Essentially this is effected by utilizing the amplitude of the Doppler signal envelope to designate an approximate range zone, and another characteristic of the Doppler signal envelope to designate a specific range within the aforestated approximate range zone. The amplitude designation is employed to eliminate ambiguities in the said other characteristic where that characteristic may occur at a plurality of different range zones. The said other characteristic may preferably be the existence of an intersection between two functions of the Doppler signal, a zero crossing or phase reversal of a Doppler signal function, or a minimum amplitude of a Doppler signal function. These latter characteristics are, of course, independent of received signal strength, and therefore are not subject to the errors attendant a system dependent solely on amplitude, which would vary with many factors, such as target reflectivity, trajectory and target geometry, and antenna field pattern.

The foregoing specific examples of the invention are obviously only illustrative in nature, and it is not intended that the invention be construed as limited thereto. Many modifications and variations of the systems described herein will be apparent to those skilled in the art, and such as are embraced by the spirit and scope of the appended claims are considered to be within the purview of the present invention.

What is claimed is:

1. In a continuous wave, frequency modulated ranging system for measuring the distance between two bodies by transmitting a signal from one body and receiving the echo signal from the other body, means for detecting the strength of the received signal, means for obtaining a function of the received signal having a detectable characteristic occurring at a plurality of predetermined specific ranges between said bodies, and means for detecting the simultaneous occurrence of said characteristic and a received signal strength of a predetermined value to indicate the occurrence of a predetermined range between said two bodies.

2. In a ranging system as set forth in claim 1, said function obtaining means including means for obtaining a plurality of signal functions wherein said detectable characteristic is a defined relationship therebetween.

3. In a ranging system as set forth in claim 2, said function obtaining means providing a $J_2$ Bessel function of the Doppler signal envelope.

4. In a ranging system as set forth in claim 1, means for obtaining from the received signal a first $J_2$ Bessel function of the Doppler signal envelope, means coupling said signal function to said signal strength detecting means for detecting the strength of the received signal, and said function of the received signal having a detectable characteristic being a second $J_2$ Bessel function of the Doppler signal envelope.

5. In a ranging system as set forth in claim 4, said first $J_2$ Bessel function signal being the function $F(\theta) \cos(2\theta - 20°)$.

6. A system for transmitting a continuous wave, frequency modulated signal and for receiving the echo signal thereof for measuring the range between said system and a reflecting body, comprising filter means for obtaining from the received signal a selected Bessel function thereof, means for generating two signals and for mixing said generated signals with said selected function signal to produce two Doppler envelope functions of said selected function signal, means for detecting the strength of the received signal from one of said Doppler envelope function signals, means for detecting a characteristic of the other of said Doppler envelope function signals occurring at a plurality of predetermined specific ranges, and means for detecting the simultaneous occurrence of said characteristic and a received signal strength of a predetermined value to indicate the occurrence of a predetermined range.

7. A system as set forth in claim 6, wherein said characteristic of said other Doppler envelope function signal is amplitude equality with said one Doppler envelope function signal.

8. A system as set forth in claim 7, wherein said Bessel function ia a $J_2$ function.

9. A system as set forth in claim 6, wherein said characteristic of said other Doppler envelope function signal is amplitude zero crossing.

10. A system as set forth in claim 9, wherein said Bessel function is a $J_2$ function.

11. A system as set forth in claim 6, wherein said generating means generates three signals and mixes said generated signals with said selected function signal to produce three Doppler envelope functions of said selected function signal, and said characteristic detecting means detects the occurrence of amplitude equality between two of said three Doppler envelope function signals.

12. A system as set forth in claim 11, wherein said Bessel function is a $J_2$ function.

13. A system as set forth in claim 6, wherein the two generated signals are defined by the same function but differ in phase angle.

* * * * *